United States Patent [19]

Forrest

[11] Patent Number: 4,552,096

[45] Date of Patent: Nov. 12, 1985

[54] SORTING GATE ASSEMBLY

[76] Inventor: William J. Forrest, 3400 NW. Expressway, Suite 740, Oklahoma City, Okla. 73112

[21] Appl. No.: 672,940

[22] Filed: Nov. 19, 1984

[51] Int. Cl.[4] .............................................. A01K 29/00
[52] U.S. Cl. .................................................. 119/155
[58] Field of Search ...................... 119/155, 99, 29, 20

[56] References Cited

U.S. PATENT DOCUMENTS

| | | | |
|---|---|---|---|
| 2,050,527 | 8/1936 | Grabe | 119/155 |
| 3,545,407 | 12/1970 | Moore | 119/20 |
| 3,970,045 | 7/1976 | Graham, Jr. | 119/20 |
| 4,275,685 | 6/1981 | Hopkins | 119/20 |

Primary Examiner—Hugh R. Chamblee
Attorney, Agent, or Firm—Dunlap, Codding & Peterson

[57] ABSTRACT

A sorting gate assembly adapted for use in cooperation with a holding pen including a sorting gate and a gate support assembly. The sorting gate is movably connected to the gate support assembly for movement in a first direction generally toward the gate support assembly and for movement in a second direction generally away from the gate support assembly. The gate support assembly also movably supports the sorting gate for movement of the sorting gate in a first direction generally away from the exit of the holding pen and for movement in a second direction generally toward the exit of the holding pen. The sorting gate is movably supported on the gate support assembly for movement within the holding pen to sort a selected animal and to move the sorted animal into an exit area portion of the holding pen for exiting the animal through the exit of the holding frame.

16 Claims, 6 Drawing Figures

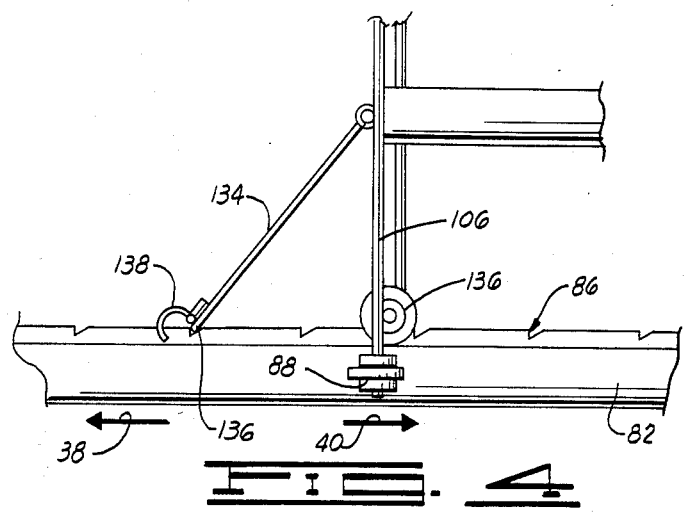
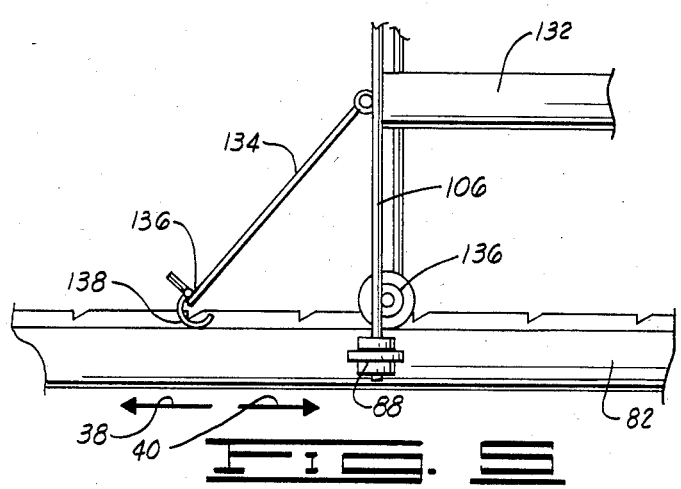
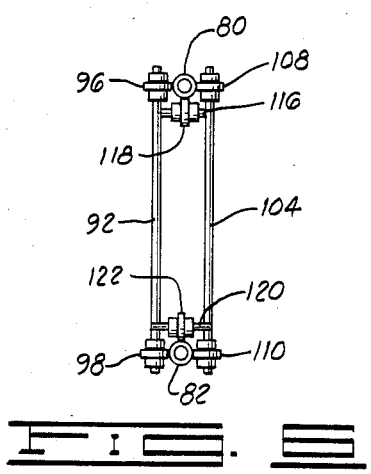

4,552,096

SORTING GATE ASSEMBLY

CROSS REFERENCE TO RELATED APPLICATION

A gate supported on a gate track assembly and carriage which are constructed like the gate, gate track assembly and carriage disclosed herein are disclosed in Applicant's co-pending application entitled ANIMAL HOLDING CHUTE, Ser. No. 620,631, filed on June 14, 1984. The co-pending application also discloses a release and stop which are constructed like the release and stop disclosed herein.

BACKGROUND OF THE INVENTION

Field of the Invention

The present invention relates generally to sorting gate assemblies adapted for use with a holding pin and, more particularly, but not by way of limitation, to a sorting gate assembly having a sorting gate which is movably connected to a gate support assembly for moving a selected animal into an exit position for cooperating to exit the selected animal from a holding pen.

BRIEF DESCRIPTION OF THE DRAWINGS

FIG. 4 is a side elevational view showing a portion of the gate support assembly positioned for limiting movement of the sorting gate to one direction.

FIG. 5 is a view similar to FIG. 4, but showing a portion of the gate support assembly positioned for permitting movement of the sorting gate in a first and a second direction.

FIG. 6 is an end elevational view showing a portion of the carriage connected to the gate track assembly.

DESCRIPTION OF THE PREFERRED EMBODIMENT

Figure 1:
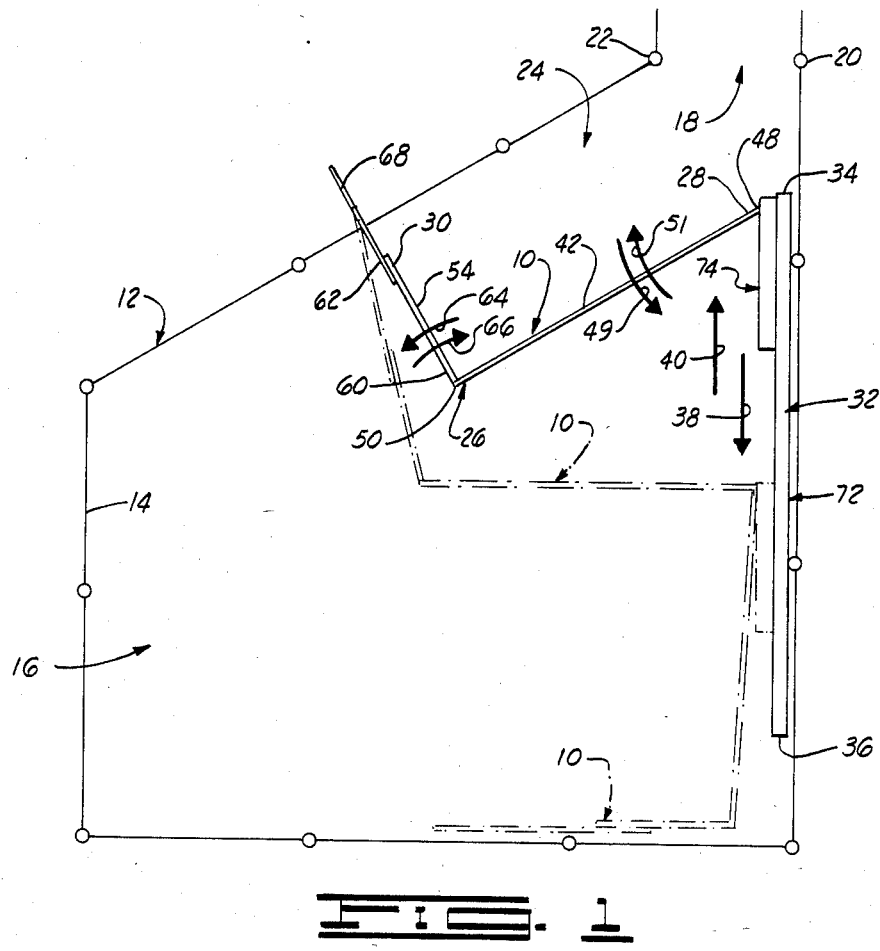
FIG. 1 is a top elevational, diagrammatic view showing the sorting gate assembly operatively associated with a holding pen with the sorting gate being shown in solid lines positioned in an exit position for cooperating to exit a sorted animal from the holding pen, the sorting gate being shown in dashed lines in two different working positions within the animal holding space defined by the holding pen.
Figure 2:
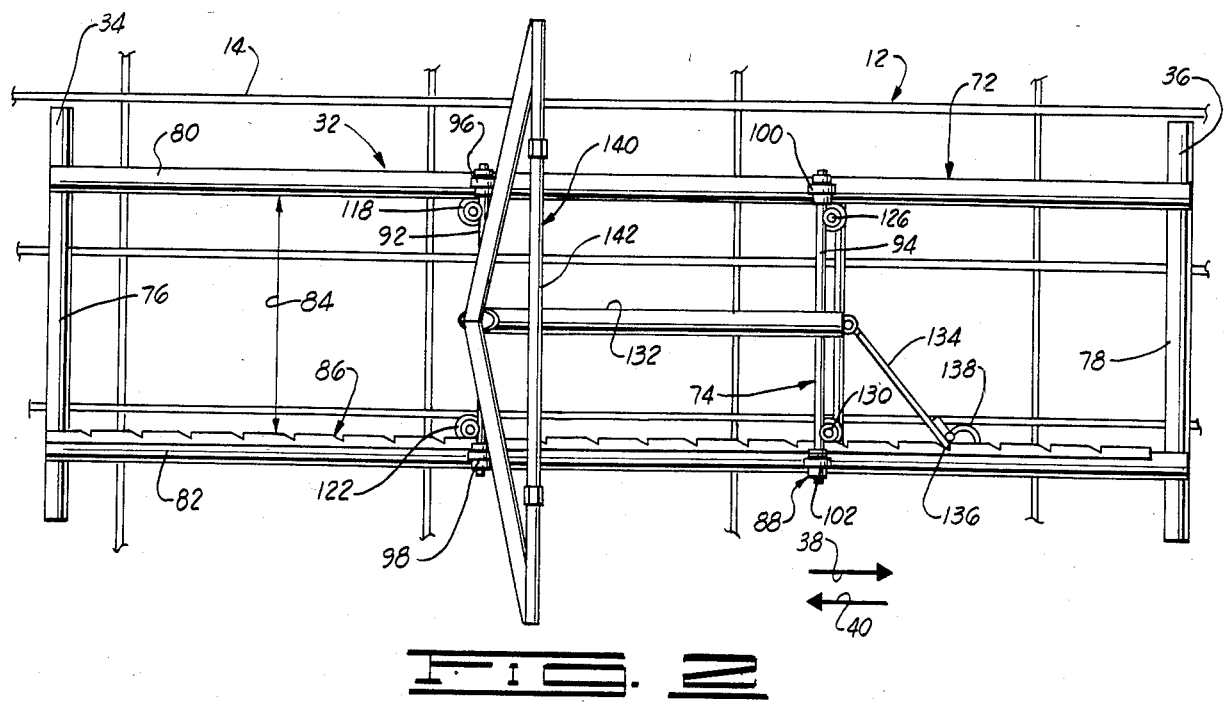
FIG. 2 is a side elevational view of the gate support assembly of the present invention, a portion of the holding frame of the holding pen also being shown in FIG. 2.
Figure 3:
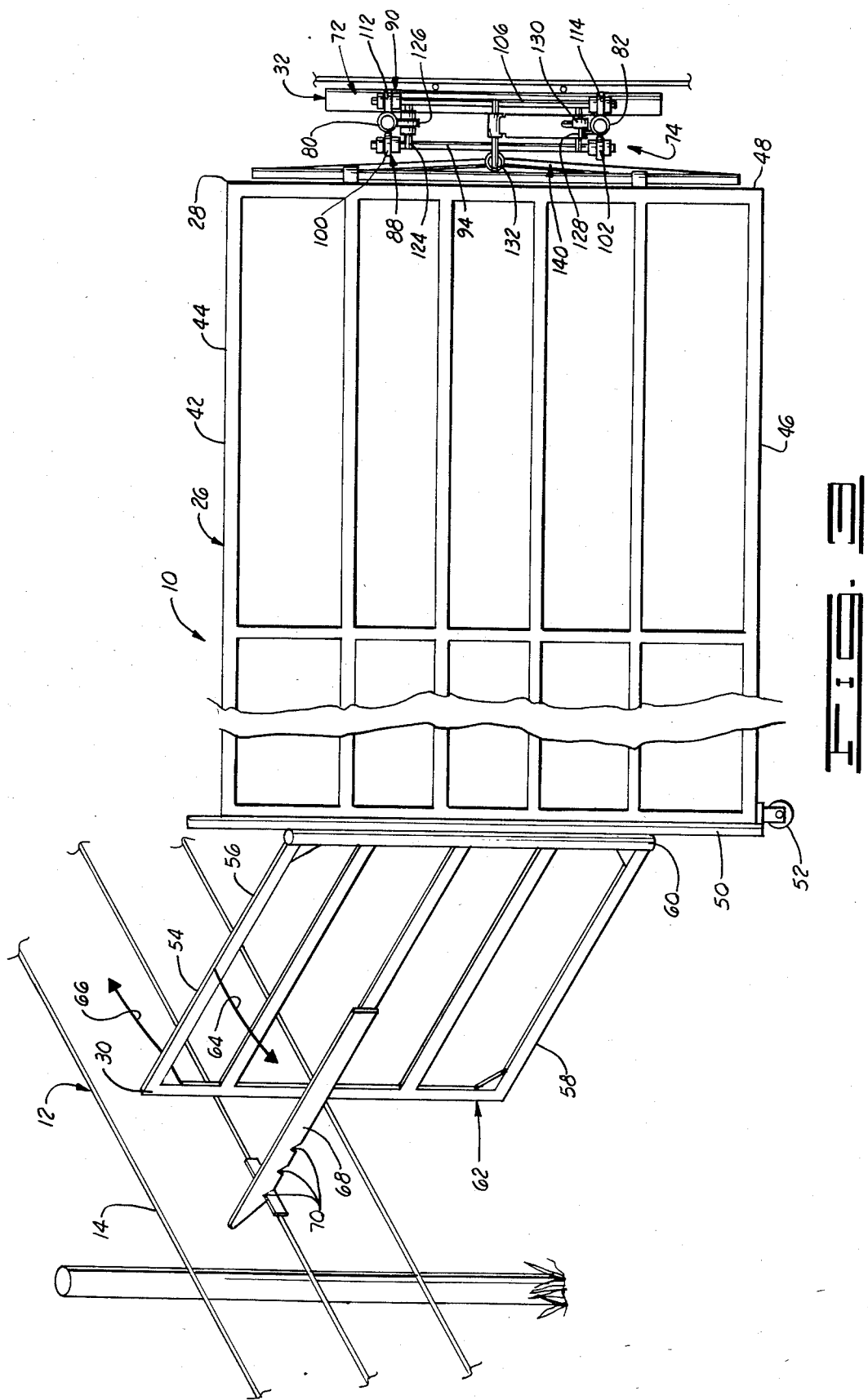
FIG. 3 is a perspective view of the sorting gate assembly of the present invention shown in the exit position and showing an end elevational view of the gate support assembly, a portion of the sorting gate being shown as a fragmentary view.

Referring to the drawings in general and to FIGS. 1, 2 and 3 in particular, shown therein and designated by the general reference numeral 10 is a sorting gate assembly which is constructed in accordance with the present invention. The sorting gate assembly 10 of the present invention particularly is adapted for use in cooperation with what is commonly referred to in the art as a holding pen and a holding pen is diagrammatically shown in FIG. 1 and designated therein by the general reference numeral 12, portions of the holding pen being shown in FIGS. 2 and 3. The holding pen 12 includes a holding frame 14 which generally is secured in the earth and retainingly surrounds an area referred to herein as an animal holding space, the animal holding space being designated in FIG. 1 by the general reference numeral 16. An exit 18 is formed through a portion of the holding frame 14 and the exit 18 has a first side 20 formed by one end portion of the animal holding frame 14 and a second side 22 formed by one other end portion of the holding frame 14. The holding frame 14 is sized and shaped so that the animal holding space 16 is shaped and adapted for accommodating two or more animals and the holding frame 14 also is sized and shaped for cooperating to retainingly hold the animals within the animal holding space 16. The exit 18 is sized and shaped to permit an animal to pass or exit therethrough from the animal holding space 16. Holding pens having holding frames defining animal holding spaces and exits for permitting animals to exit from the animal holding space such as generally described before with respect to the holding pen 12 are well known in the art and a detailed description of the construction and the operation of such holding pens is not deemed necessary herein.

The sorting gate assembly 10 of the present invention particularly is adapted to permit an operator to move a portion of the sorting gate assembly 10 to various positions within the animal holding space 16 for sorting out a selected or sorted animal and for moving that selected, sorted animal into an exit area 24 (shown in FIG. 1) which is in communication with the exit 18 for permitting the selected, sorted animal to exit from the exit area 24 through the exit 18, thereby permitting the selected, sorted animal to exit from the animal holding space 16 through the exit 18. As shown in FIG. 1, the exit area 24 is a portion of the animal holding space 16.

As shown more clearly in FIG. 1, the sorting gate assembly 10 generally includes a sorting gate 26 having a first end 28 and a second end 30 and a gate support assembly 32 having a first end 34 and a second end 36. The first end 34 of the gate support assembly 32 is disposed generally near the first side 20 of the exit 18 and the gate support assembly 32 extends a distance from the exit 18 terminating with the second end 36 of the gate support assembly 32, the gate support assembly 32 extending generally along one side of the holding pen 12 and generally along a portion of the holding frame 14. The gate support assembly 32 extends generally along a linear path between the opposite first and second ends 34 and 36.

The first end 28 of the sorting gate 26 is movably connected to the gate support assembly 32 so that the sorting gate 26 is movable along a substantially linear path in a first direction 38 (generally from the first end 34 toward the second end 36 of the gate support assembly 32) generally away from the exit 18 and so that the sorting gate 26 is movable along a substantially linear path in an opposite second direction 40 (generally from the second end 36 toward the first end 34 of the gate support assembly 32) generally toward the exit 18.

The sorting gate 26 more particularly includes a sorting base frame 42 (shown in FIGS. 1 and 3) which is generally rectangularly shaped having an upper end 44, a lower end 46, a first end 48 and an opposite second end 50. In one preferred embodiment as shown in FIG. 3, the sorting base frame 42 is constructed of various bars interconnected to form the rectangularly shaped structure with one of the bars forming the upper end 44, one of the bars forming the lower end 46, one of the bars forming the first end 48 and one of the bars forming the second end 50 of the sorting base frame 42. The first end 48 of the sorting base frame 42 is movably or, more particularly, pivotally connected to the gate support assembly 32 for movement in a first direction 49 (shown in FIG. 1) generally along an arcuate path and an opposite second direction 51 (shown in FIG. 1) generally along an arcuate path relative to the gate support assembly 32. A roller 52 is rollingly secured to the lower end 46 of the sorting base frame 42 generally near the second end 50 of the sorting base frame 42 and the roller 52 is adapted and positioned to rollingly support the sorting base frame 42 on the earth's surface with the sorting base frame 42 extending generally perpendicularly upwardly from the earth's surface.

As shown more clearly in FIGS. 1 and 3, the sorting gate 26 also includes a gate frame 54. The gate frame 54 has an upper end 56, a lower end 58, a first end 60 and an opposite second end 62. In one preferred embodiment, the gate frame 54 is constructed of a plurality of bars which are interconnected to form a generally rectangularly shaped gate frame 54 with one of the bars forming the upper end 56, one of the bars forming the lower end 58, one of the bars forming the first end 60 and one of the bars forming the second end 62. The first end 60 of the gate frame 54 is pivotally or, more particularly, hingedly connected to the second end 50 of the sorting base frame 42 so that the gate frame 54 can be hingedly or pivotally moved in a first direction 64 shown in FIG. 1) generally along an arcuate and in an opposite second direction 66 (shown in FIG. 1) generally along an arcuate path relative to the second end 50 of the sorting gate frame 42.

The gate frame 54 also includes a gate latch 68 (shown in FIGS. 1 and 3) which is secured to the second end 62 of the gate frame 54 generally between the upper and the lower ends 56 and 58 of the gate frame 54. A portion of the gate latch 68 extends a distance generally away from the second end 62 of the gate frame 54 and a plurality of latch notches 70 (three latch notches 70 being shown in FIG. 3) are formed in the gate latch 68 with each of the latch notches 70 being sized and shaped to be removably latched to a portion of the holding frame 14, in a manner and for reasons to be made more apparent below.

As shown in FIGS. 1, 2 and 3, the gate support assembly 32 includes a gate track assembly 72 and a carriage 74. As shown more clearly in FIG. 2, the gate track assembly 72 includes a first post 76 which is connected to a portion of the holding frame 14 and which is disposed generally near the first side 20 of the exit 18 and a second post 78 which is spaced a distance from the first post 76 and which is connected to and supported by a portion of the holding frame 14, the first post 76 forming the first end 34 of the gate support assembly 32 and the second post 78 forming the second end 36 of the gate support assembly 32. The first and the second posts 76 and 78 also can be supported in the earth and disconnected from the holding frame 14. The gate track assembly 72 extends generally along a linear path generally between the first and the second posts 76 and 78, although the gate track assembly 72 could be constructed to extend generally along a cirvilinear path if desired in a particular application.

One end of a first rail 80 is connected to the first post 76 and the opposite end of the first rail 80 is connected to the second post 78, the first rail 80 extending generally between the first and the second posts 76 and 78. One end of a second rail 82 is connected to a portion of the first post 76 and the opposite end of the second rail 82 is connected to a portion of the second post 78, the second rail 82 extending generally between the first and the second posts 76 and 78. The first rail 80 is disposed in a plane generally parallel with the planar disposition of the second rail 82 and the first rail 80 is spaced a distance 84 from the second rail 82.

As shown in FIG. 2, a plurality of teeth 86 are formed on a portion of the second rail 82. The teeth 86 are spaced a distance apart and the teeth 86 extend generally along the length of the second rail 82 generally between the first and the second posts 76 and 78.

As shown in FIGS. 2 and 3, the carriage 74 includes a first roller assembly 88 and a second roller assembly 90. The first roller assembly 88 is journally supported on the carriage 74 and has a portion in rolling engagement with portions of the first and the second rails 80 and 82, the first roller assembly 88 being disposed generally on one side of the first and the second rails 80 and 82. The second roller assembly 90 also is journally connected to the carriage 74 and has portions in rolling engagement with the first and the second rails 80 and 82, the second roller assembly 90 being disposed generally on the opposite side of the first and the second rails 80 and 82 with respect to the disposition of the first roller assembly 88. The first roller assembly 88 is aligned with the second roller assembly 90 and the first and the second roller assemblies 88 and 90 cooperate to rollingly support the carriage 74 on the first and the second rails 80 and 82 so the carriage 74 can be moved on the gate track assembly 72 in the first and the second directions 38 and 40.

As shown in FIGS. 2 and 3, the first roller assembly 88 includes a first shaft 92 and a second shaft 94. The first shaft 92 is spaced a distance from the second shaft 94 and the first shaft 92 extends in a plane generally coplanar with respect to the planar disposition of the second shaft 94. The first and the second shafts 92 and 94 each extend generally between the first and the second rails 80 and 82.

A roller 96 is journally connected to one end of the first shaft 92 and the roller 96 is disposed to rollingly engage a portion of the first rail 80. Another roller 98 is journally connected to the opposite end of the first shaft 92 and the roller 98 is disposed to rollingly engage a portion of the second rail 82. A roller 100 is journally connected to one end of the second shaft 94 and the roller 100 is disposed to rollingly engage a portion of the first rail 80. A roller 102 is journally connected to the opposite end of the second shaft 94 and the roller 102 is disposed to rollingly engage a portion of the second rail 82.

As shown in FIGS. 3 and 6, the second roller assembly 90 includes a first shaft 104 and a second shaft 106. The first shaft 104 is spaced a distance from the second shaft 106 and the first shaft 104 extends in a plane generally coplanar with respect to the planar disposition of the second shaft 106. The first and the second shafts 104 and 106 each extend generally between the first and the second rails 80 and 82.

As shown in FIG. 6, a roller 108 is journally connected to one end of the first shaft 104 and the roller 108 is disposed to rollingly engage a portion of the first rail 80. Another roller 110 is journally connected to the opposite end of the first shaft 104 and the roller 110 is disposed to rollingly engage a portion of the second rail 82.

As shown in FIG. 3, a roller 112 is journally connected to one end of the second shaft 106 and the roller 112 is disposed to rollingly engage a portion of the first rail 80. A roller 114 is journally connected to the opposite end of the second shaft 106 and the roller 114 is disposed to rollingly engage a portion of the second rail 82.

As shown in FIG. 6, one end of a shaft 116 is connected to a portion of the first shaft 92 generally near the roller 96 and the shaft 116 extends generally between the first and the second roller assemblies 88 and 90 with the opposite end of the shaft 116 being connected to the first shaft 104 generally near the roller 108. A roller 118 is journally supported on the shaft 116 and the roller 118 is disposed to rollingly engage a portion of the first rail 80 generally along the underside of the first rail 80.

As shown in FIG. 6, one end of shaft 120 is connected to a portion of the first shaft 92 generally near the roller 98 and the shaft 120 extends generally between the first and the second roller assemblies 88 and 90 with the opposite end of the shaft 120 being connected to the first shaft 104 generally near the roller 110. A roller 122 is journally supported on the shaft 120 and the roller 122 is disposed to rollingly engage a portion of the second rail 82 generally along the upper side of the second rail 82.

As shown in FIG. 3, one end of a shaft 124 is connected to a portion of the second shaft 94 generally near the roller 100 and the shaft 124 extends generally between the first and the second roller assemblies 88 and 90 with the opposite end of the shaft 124 being connected to the second shaft 106 generally near the roller 112. A roller 126 is journally supported on the shaft 124 and the roller 126 is disposed to rollingly engage a portion of the first rail 80 generally along the underside of the first rail 80.

As shown in FIG. 3, one end of a shaft 128 is connected to a portion of the second shaft 94 generally near the roller 122 and the shaft 128 extends generally between the first and the second roller assemblies 88 and 90 with the opposite end of the shaft 128 being connected to the second shaft 106 generally near the roller 114. A roller 130 is journally supported on the shaft 116 and the roller 130 is disposed to rollingly engage a portion of the second rail 82 generally along the upper side of the second rail 82.

As shown in FIGS. 2 and 3, a bar 132 extends generally between the first and the second shafts 92 and 94 of the first roller assembly 88 with a portion of one end of the bar 132 being secured to the first shaft 92 generally midway between the opposite ends of the first shaft 92 and the opposite end of the bar 132 being secured to a portion of the second shaft 94 of the first roller assembly 88 generally midway between the opposite ends of the second shaft 94.

As shown in FIGS. 2, 4 and 5, one end of a stop bar 134 is pivotally connected to one end of the bar 132 and the stop bar 134 extends a distance from the bar 132 terminating with a stop end 136 of the stop bar 134. The stop end 136 of the stop bar 134 is shaped and positioned to engage the teeth 86 formed on the second rail 82 as the carriage 74 is moved in the first and the second directions 64 and 66. An arcuately shaped release 138 is pivotally connected to the stop end 136 of the stop bar 134 and the release 138 is positioned to engage a portion of the upper surface of the second rail 82 in one pivotal position of the release 138.

As shown in FIGS. 2 and 3, a gate support 140 is connected to the bar 132 on the carriage 74. The gate support 140 includes a rod 142 and bars 144 and 146.

One end of the bar 144 is connected to one end of the bar 146 and the connected ends of the bars 144 and 146 are connected to the bar 132. One end of the rod 142 is connected to one end of the bar 144 and the opposite end of the rod 142 is connected to one end of the other bar 146, the rod 142 and the bars 144 and 146 cooperating to form a generally triangularly shaped gate support 140. The rod 142 is adapted to be hingedly connected to the first end 48 of the sorting gate frame 42 thereby pivotally or hingedly supporting the sorting gate frame 42 on the carriage 74.

In operation, the sorting gate frame 42 initially is pivotally moved to a position wherein the sorting gate frame 42 is disposed generally near the gate support assembly 32 and wherein the sorting base frame 42 and the gate frame 54 each extend generally along one side of the holding frame 14. In this position, the sorting gate assembly 10 is stored along a portion of the holding frame 14 in an out-of-the-way or storage position.

When it is desired to sort one of the animals from the animal holding space 16, an operator grips the sorting gate 26 generally near the second end 50 of the sorting base frame 42 and moves the sorting gate 26 generally in the first direction 38 away from the exit 18, the sorting gate 26 being rollingly supported by the roller 52 as the sorting gate 26 is moved about the animal holding space 16. The sorting gate 26 more particularly is connected to the carriage 74 and the carriage 74 moves in the first direction 38 thereby permitting the sorting gate 26 to be moved in the first direction 38. The sorting gate 26 is moved in the first direction 38 until the sorting gate 26 has been positioned within the animal holding space 16 generally in the vicinity of the particular animal to be sorted out. Then, the sorting base frame 42 is moved in the directions 49 and 51 and the gate frame 54 is moved in the directions 64 and 66 to maneuver the sorting gate 26 into a position wherein the animal to be sorted is disposed generally between the sorting gate 26 and the exit 18. In this position of the sorting gate 26, the sorting base frame 42 is moved in the directions 49 and 51 and the gate frame 54 is moved in the directions 64 and 66 to maneuver the sorting gate 26 and the animal to be sorted generally toward the exit 18 until the sorting gate 26 has been positioned in the exit position (shown in solid lines in FIG. 1) wherein the animal to be sorted is disposed between the sorting gate 26 and the exit 18 and to a position wherein the gate frame 54 can be removably connected to a portion of the holding frame 14. The gate latch 68 then is removably connected to a portion of the holding frame 14, the gate latch 68 more particularly being removably connected to a portion of the holding frame 14 by removably connecting one of the notches 70 in the gate latch 68 to a portion of the holding frame 14 as shown more clearly in FIG. 3. In this exit position of the sorting gate 26, the sorting gate 26 is connected to a portion of the holding frame 14 and the sorting gate 26 cooperates with portions of the holding frame 14 to surround the animal to be sorted generally in an exit area so the animal to be sorted can be exited from the holding pen through the exit 18.

After the animal to be sorted has exited through the exit 18, the gate frame 54 then can be disconnected from the holding frame 14 and the sorting gate 26 then can be moved to a storage position generally adjacent the gate track assembly 72.

It should be noted that the sorting gate 26 may be moved simultaneously in the directions 38 and 40, in the directions 49 and 51 and in the directions 64 and 66 to sort out a particular animal and to move the animal and the sorting gate 26 to the exit position.

When initially maneuvering the sorting gate 26 within the animal holding space 16 to position the sorting gate 26 in the general vicinity of the animal to be sorted, the release 138 is pivoted to engage the upper surface of the second rail 82 so the stop end 136 of the stop bar 134 is positioned above the notches or teeth 86. In this position of the release 138, the carriage 74 and the sorting gate 26 connected thereto can be moved in either the first or the second direction 38 and 40. After the sorting gate 26 has been positioned generally about the animal to be sorted, the release 138 then is pivotally moved to disengage the release 138 from the upper surface of the second rail 82 and to position the stop end 136 of the stop bar 140 in engagement with the teeth 86. In this position of the stop bar 134, the stop bar 134 prevents the carriage 74 from being moved in the direction 38, thereby preventing the animal to be sorted from moving the sorting gate 26 and the carriage 74 connected thereto in a direction 38 generally away from the exit 18 which facilitates the moving of the animal to be sorted to the area generally defined as the exit area 24.

For example, the sorting gate 26 and the carriage 74 connected thereto initially may be moved in the direction 38 to a position wherein the sorting base frame 42 still remains generally adjacent the gate track assembly 72 and then the gate frame 54 may be pivoted in the direction 64 to a position wherein the gate frame 54 is disposed generally adjacent a portion of the holding frame 14. This position of the sorting gate 26 being shown in dashed lines in FIG. 1. In this position, the animal to be sorted would be generally between the sorting base frame 42 and the gate frame 54 and the exit 18. After the sorting gate 26 has been positioned in this initial position with respect to the animal to be sorted, the sorting gate frame 42 then may be moved in the second direction 51 to a position wherein the sorting base frame 42 extends generally perpendicularly from the gate track assembly 72 and the gate frame 54 extends from the sorting base frame 42 to a position wherein the second end 62 of the gate frame 54 is disposed generally near a portion of the holding frame 14. As the sorting gate 26 is maneuvered about the animal holding space 16 in the manner just described, the sorting gate 26 also is being utilized to move the animal toward the exit area 24 portion of the animal holding space 16. This second described position of the sorting gate 16 also is shown in dashed lines in FIG. 1.

Changes may be made in the construction and the operation of the various components and assemblies described herein without departing from the spirit and the scope of the invention as defined in the following claims.

What is claimed is:

1. A sorting gate assembly adapted for use in cooperation with a holding pen having a holding frame retainingly surrounding an animal holding space and having an exit formed through a portion thereof having a first side and a second side wherein the animal holding space is sized and shaped for accommodating at least two animals and wherein the holding frame is sized and shaped for cooperating to retainingly hold animals within the animal holding space and wherein the exit is sized and shaped to permit an animal to pass therethrough and exit from the animal holding space, the sorting gate assembly comprising:

a sorting gate having a first end and a second end; and a gate support assembly having a first end and a second end, the first end of the sorting gate being movably connected to the gate support assembly for movement in a first direction generally toward the gate support assembly and for movement in a second direction generally away from the gate support assembly, the gate support assembly movably supporting the sorting gate for movement of the sorting gate in a first direction generally away from the exit and for movement in a second direction generally toward the exit, the sorting gate being movable in the first direction generally away from the exit and in the second direction generally toward the exit and the sorting gate being movably connected to the gate support assembly for maneuvering the sorting gate to maneuver a selected sorted animal into an exit area portion of the animal holding space generally near the exit wherein the sorting gate cooperates with a portion of the holding frame to confine an animal in the exit area for exiting the animal through the exit in the holding frame.

2. The sorting gate assembly of claim 1 wherein the first end of the gate support assembly is disposed generally near the first side of the exit and the gate support assembly extending a distance from the exit terminating with the second end of the gate support assembly.

3. The sorting gate assembly of claim 1 wherein the gate support assembly extends generally along a linear path generally between the first and the second ends thereof.

4. The sorting gate assembly of claim 1 wherein the sorting gate is defined further to include a portion generally near the second end of the sorting gate which is removably connectable to a portion of the holding frame in an exit position of the sorting gate wherein the sorting gate cooperates with a portion of the holding frame to surround the exit area.

5. The sorting gate assembly of claim 1 wherein the sorting gate is defined further to include:

a sorting base frame having an upper end, a lower end, a first end and a second end, the first end of the sorting base frame forming the first end of the sorting gate;

a gate frame having an upper end, a lower end, a first end and a second end, the first end of the gate frame being movably connected to the second end of the sorting gate frame for movement in a first direction and in an opposite second direction relative to the sorting base frame; and means connected to the sorting gate for movably supporting the sorting gate on a surface of the animal holding space.

6. The sorting gate assembly of claim 5 wherein the sorting base frame is defined further as being generally rectangularly shaped and wherein the gate frame is defined further as being generally rectangularly shaped.

7. The sorting gate assembly of claim 5 defined further to include:

a gate latch having one portion connected to the second side of the gate frame and a portion of the gate latch extending a distance from the second end of the gate frame, the gate latch being removably connectable to a portion of the holding frame for securing the sorting gate in a connected position to a portion of the holding frame in an exit position of the sorting gate.

8. The sorting gate assembly of claim 5 wherein the sorting gate is pivotally connected to the gate frame for pivotal movement in the first and the second directions generally along a cirvilinear path, and wherein the first end of the gate frame is pivotally connected to the gate support assembly for pivotal movement in a first direction generally toward the gate support assembly and for pivotal movement in an opposite second direction generally away from the gate support assembly.

9. The sorting gate assembly of claim 8 wherein the gate support assembly is defined further to include:
   a gate track assembly having a first end and a second end, the first end of the gate track assembly being disposed generally near the exit of the holding frame and the gate track assembly extending a distance from the exit through the animal holding space terminating with the opposite second end of the gate track assembly; and
   a carriage movably supported on the gate track assembly for movement in the first direction generally away from the exit and generally from the first end toward the second end of the gate track assembly and for movement in an opposite second direction generally toward the exit and generally from the second end toward the first end of the gate track assembly, the first end of the sorting base frame being movably connected to the carriage.

10. The sorting gate assembly of claim 9 wherein the gate track assembly is defined further to include:
    a first rail extending generally between the first and the second ends of the gate track assembly; and
    a second rail extending generally between the first and the second end of the gate track assembly, the second rail being spaced a distance from the first rail and the second rail extending in a plane generally parallel with the coplanar disposition of the first rail; and
    wherein the carriage assembly is defined further as being rollingly supported on the first and the second rails.

11. The sorting gate assembly of claim 10 wherein the carriage is defined further to include:
    a first roller assembly disposed generally on one side of the first and the second rails and having portions rollingly engaging the first and the second rails;
    a second roller assembly disposed generally on one side of the first and the second rails, opposite the disposition of the first roller assembly, the second roller assembly having portions rollingly engaging the first and the second rails, the first and the second roller assemblies cooperating to rollingly support the carriage on the first and the second rails for rolling movement of the carriage in the first and the second directions generally between the first and the second ends of the gate track assembly.

12. The sorting gate assembly of claim 10 defined further to include:
    a stop bar having one end connected to the carriage and the stop bar extending a distance from the carriage terminating with a stop end of the stop bar; and
    wherein the second rail is defined further to include: a plurality of notches extending generally along the upper surface of the second rail and generally between the first and the second ends of the gate track assembly, the notches being positioned to engage the stop end of the stop bar and the stop bar being disposed so that the movement of the carriage in the first direction generally away from the exit and generally toward the second end of the gate track assembly is limited when the stop end of the stop bar engages one of the notches on the upper side of the second rail.

13. The sorting gate assembly of claim 12 defined further to include:
    a release movably connected to the stop end of the stop bar and having a portion engagable with a portion of the upper surface of the second rail, the release being movable to one position for lifting the stop end of the stop bar a distance from the upperside of the first rail so the carriage can be moved in the first and the second directions along the first and the second rails and the release being movable in one other direction for moving the stop end of the stop bar into engagement with the upper side of the second rail so the stop end of the stop bar is engagable with the notches in the second rail for limiting the movement of the carriage in the first direction generally away from the exit and generally toward the second end of the gate track assembly.

14. The sorting gate assembly of claim 8 wherein the first roller assembly is defined further to include:
    a first shaft having opposite ends;
    a roller journally connected to one end of the first shaft and being disposed to rollingly engage the first rail generally on one side of the first rail;
    a roller journally connected to the opposite end of the first shaft and disposed to rollingly engage the second rail generally on one side of the second rail;
    a second shaft having opposite ends;
    a roller journally connected to one end of the second shaft and being disposed to rollingly engage the first rail generally on one side of the first rail;
    a roller journally connected to the opposite end of the second shaft and being disposed to rollingly engage the second rail generally on one side of the second rail; and
    wherein the second roller assembly is defined further to include:
    a first shaft having opposite ends;
    a roller journally connected to one end of the first shaft and being disposed to rollingly engage the first rail generally on one side of the first rail;
    a roller journally connected to the opposite end of the first shaft and disposed to rollingly engage the second rail generally on one side of the second rail;
    a second shaft having opposite ends, the second shaft being spaced a distance from the first shaft and extending in a plane generally parallel with respect to the planer disposition of the first shaft;
    a roller journally connected to one end of the second shaft and being disposed to rollingly engage the first rail generally on one side of the first rail; and
    a roller journally connected to the opposite end of the second shaft and being disposed to rollingly engage the second rail generally on one side of the second rail.

15. The sorting gate assembly of claim 14 wherein the first shaft of the first roller assembly is generally aligned with and spaced a distance from the first shaft of the second roller assembly, and wherein the second shaft of the first roller assembly is generally aligned with and spaced a distance from the second shaft of the second roller assembly, the first roller assembly being spaced a distance from the second roller assembly.

16. The sorting gate assembly of claim 15 defined further to include:
- a shaft having a portion connected to the first shaft of the first roller assembly and to a portion of the first shaft of the second roller assembly, and a roller journally connected to the shaft and disposed to rollingly engage the first rail generally along the lower side of the first rail;
- a shaft having a portion connected to the first shaft of the first roller assembly and the first shaft of the second roller assembly, and a roller journally connected to the shaft and being disposed to rollingly engage the second rail generally along an upper side of the second rail; p1 a shaft having a portion connected to the second shaft of the first roller assembly and another portion connected to the second shaft of the second roller assembly, and a roller journally connected to the shaft and disposed to rollingly engage the first rail generally along a lower side of the first rail;
- a shaft having a portion connected to the second shaft of the first roller assembly and another portion connected to the second shaft of the second roller assembly, and a roller journally connected to the shaft and being disposed to rollingly engage the second rail generally along an upperside of the second rail.

* * * * *